Dec. 13, 1960 — W. L. DONNELLY — 2,963,782
FLEXIBLE COMPOSITE ARTICLE
Filed April 20, 1954

INVENTOR.
WARREN L. DONNELLY
BY
William F. Mesinger
ATTORNEY 2,963,782

FLEXIBLE COMPOSITE ARTICLE

Warren L. Donnelly, Indianapolis, Ind., assignor to Union Carbide Corporation, a corporation of New York Filed Apr. 20, 1954, Ser. No. 424,294

2 Claims. (Cl. 29—183.5)

The present invention relates to a flexible composite article and more particularly to such an article having a highly wear resistant surface Heretofore, wear resistant surfaces have been applied to machine members in the form of inserts. These inserts have been formed by sintering powders of a highly wear resistant material such as tungsten carbide. Such insert blocks are secured to the machine member as with a cement and are replaced upon wear. The mechanical bond between the insert and the base member is relatively weak and leaves much to be desired. In addition, highly wear resistant materials, such as tungsten carbide, ordinarily have high moduli of elasticity which result in cracking of the insert under the influence of only slight deformation because of the rigidity of the mounting.

In this connection it has long been desired to obtain a flexible highly wear resistant surface which is capable of sustaining a great amount of deformation without cracking. It is, therefore, the main object of the present invention to provide a flexible composite article having a highly wear resistant surface and which is suitable for rigidly mounting to a base member at a point where a highly wear resistant surface is desired.

Other aims and advantages of the present invention will be apparent from the following description and accompanying claims.

Figure 1:
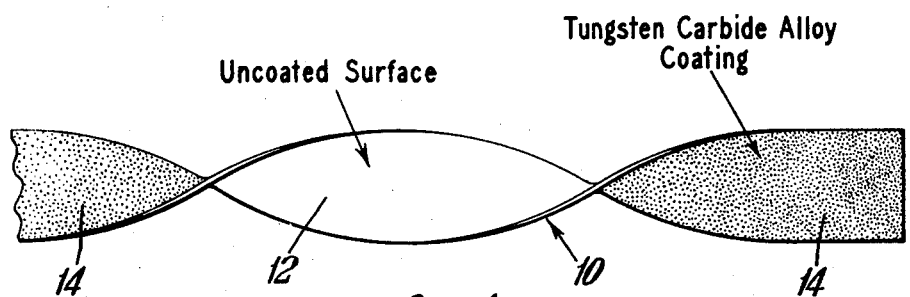
Fig. 1 is a perspective view of a flexible composite article embodying the invention and having a highly wear resistant surface.
Figure 2:
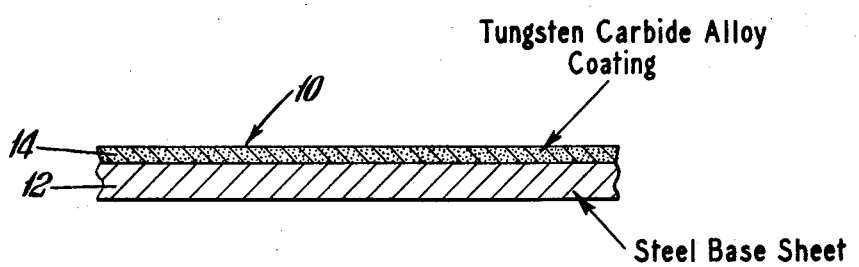
Fig. 2 is a partially cross-sectional view of the article of Fig. 1 showing the base metal strip and thin wear resistant coating.

In accordance with the present invention, and referring to the drawing, a flexible composite article 10 is provided comprising a thin flexible metallic base sheet of metal 12 having a melting point in excess of about 600° F. and a thin surface layer of normally-inflexible hard surface material 14 mechanically bonded thereto without any substantial alloying between said base sheet and said surface layer, said surface layer having a laminar structure, less than about 3% porosity, and a density substantially equal to the bulk density of solid cast hard surface material of the same composition.

It has been found that surface coatings of high melting point highly wear resistant materials, such as tungsten carbide alloy powders, may be applied to surfaces having melting points in excess of about 600° F. by the method described in detail in U.S. Patent No. 2,714,563, issued to R. M. Poorman et al.

In that method a single fluid fuel charge or a rapid succession of fluid fuel charges of proper composition to be detonated is fed into a gun where it is ignited to establish a single detonation or a series of detonations following one another at short time intervals. Into this gun comminuted solid materials, such as tungsten carbide alloy powder, are introduced in such manner that they are accelerated by the detonations and their associated phenomena and projected from the open end of the gun and directed onto the surface to be coated.

It has been found that a great variety of coatings of high melting point materials having high wear resistant characteristics may be deposited in this manner to provide a surface mechanically bonded to the base metal with negligible alloying with or contamination of the base metal. Some of the materials which may be coated are described in great detail in U.S. Patent No. 2,714,563, issued to P. M. Poorman et al.

Figure 3:
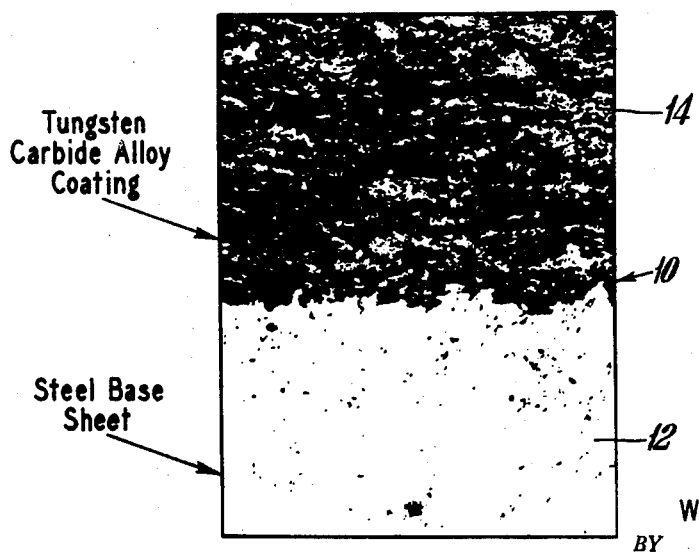
Fig. 3 is a photomicrograph at 300 diameters magnification showing the flexible metal base sheet and highly wear resistant surface mechanically bonded thereto.

It has been found that the surface coating obtained in accordance with the method described hereinabove is laminar in structure (as shown in Fig. 3 of the drawing for a tungsten carbide alloy coating) and has less than about 3% porosity, in most cases the porosity being less than 1%, and a density substantially equal to the bulk density of solid cast hard surface material of the same composition.

It has been found that flexible sheets or strips of metal having a wear resistant surface coating in accordance with the invention maintain their flexibility to produce a composite article having, in addition to a highly wear resistant surface, great flexibility.

It has been found that coatings of wear resistant material can be deposited, in accordance with the method described hereinabove, in thicknesses between about 0.001 inch and 0.01 inch to give a flexible composite article as well as a firm mechanical bond between the coating and the base metal sheet.

It has been found that the flexible base metal material must necessarily have a melting point in excess of about 600° F. since, in accordance with the coating method described hereinabove, the base metal is subjected to temperatures up to about 600° F. Should the melting of the base metal occur during the coating operation, alloying of the coating with the base metal would occur, thereby resulting in a weaker bond between the coating and the base metal.

A great number of thin flexible base metal strips have been flame-plated with various high wear resistant materials. Coatings of tungsten carbide alloys, chromium carbide alloys, titanium carbide alloys, boron carbide, and the like, have been deposited on thin metal strips to thicknesses varying between 0.001 inch and 0.01 inch and have resulted in highly flexible composite articles. It has been found that highly flexible composite articles are obtainable for all these materials over the entire range of coating thicknesses (0.001 inch to 0.01 inch).

In one such coating application, a thin flexible strip of steel, 7 inches in length, ¾ inch in width and 0.005 inch thickness, was coated on one surface with a high wear resistant material having the composition 92% tungsten carbide—8% cobalt to a thickness of approximately 0.002 inch. The composite article so obtained was bent until a radius of curvature of approximately one-eighth of an inch was obtained with no cracking of the coating being visible at a magnification of forty-five times. It has been found that, for coatings of greater thickness, the flexibility of the composite strip is decreased.

In another similar coating application a 0.002 inch coating of the same material on a 0.0625 inch steel strip was bent in the manner described above and though the coating did crack, it was found not to separate from the base and peel or flake off. It was found that relatively thick coatings (0.005 to 0.01 inch) on a relatively thin base strip (0.005 inch) tended to spall and flake off when bent in the manner described above.

Flexible composite articles, in accordance with the present invention, have been utilized in the following commercial applications: as bending dies for forming such articles as chain links; brick molds for forming raw ceramic powder into desired shapes; machine lathe ways for guiding lathe heads; mixing blades for mixing slurries; work-handling guides for directing the motion of articles around a curved path; and wire drawing capstans for pulling wire through reducing dies.

In many, if not all, of these applications, flexible composite strips, in accordance with the invention, were fastened to metal machine members of steel, iron or the like, by soldering or by using high strength resins or glues, as are well known to the art, to produce a machine member having secured thereto a flexible composite article with a highly wear resistant surface.

What is claimed is:

1. A thin, flexible, hard-surfaced composite strip material adapted to be conformed to the surface of a machine part having varying contours comprising a thin, metallic base strip having a thickness up to $\frac{1}{16}$ of an inch and a melting point in excess of 600° F. and a coating applied to said base, said coating having a thickness between 0.001 and 0.01 inch and bonded to said base without substantial alloying at the interface thereof, said coating having a porosity less than 3 percent, a density substantially equal to the bulk density of solid cast-hard material of the same composition and comprising a lamellar structure of interlocking and overlapping microscopic leaves mechanically bonded to each other and to said base, said coating being formed by introducing a powdered composition containing at least 92 percent of a material chosen from the group consisting of tungsten carbide alloys, chromium carbide alloys, titanium carbide alloys and boron carbide alloys, the remaining material being cobalt, into a high velocity, high temperature gas stream and directing said powder-laden gas stream against said base metal.

2. A thin, flexible, hard-surfaced composite strip substantially as described in claim 1 wherein the strip metal is steel having a thickness up to $\frac{1}{16}$ of an inch.

References Cited in the file of this patent

UNITED STATES PATENTS

| | | |
|---|---|---|
| 1,005,142 | Becker | Oct. 10, 1911 |
| 1,582,407 | King | Apr. 27, 1926 |
| 1,812,811 | Strauss | June 30, 1931 |
| 1,904,568 | Taylor | Apr. 18, 1933 |
| 2,367,286 | Keeleric | Jan. 16, 1945 |
| 2,464,437 | Dasher | Mar. 15, 1949 |
| 2,473,686 | Keene | June 21, 1949 |
| 2,497,090 | Miller | Feb. 14, 1950 |
| 2,590,074 | Bloom | Mar. 25, 1952 |
| 2,592,414 | Gibson | Apr. 8, 1952 |
| 2,676,393 | Lieberman | Apr. 27, 1954 |
| 2,704,884 | Ingels | Mar. 29, 1955 |
| 2,714,563 | Poorman | Aug. 2, 1955 |